(12) United States Patent
Moore

(10) Patent No.: US 8,789,663 B2
(45) Date of Patent: *Jul. 29, 2014

(54) BICYCLE HYDRAULIC BRAKE CLAMP

(75) Inventor: Wayne-Ian Moore, Changhua (TW)

(73) Assignee: Ashima Ltd., Changhua (TW)

( * ) Notice: Subject to any disclaimer, the term of this patent is extended or adjusted under 35 U.S.C. 154(b) by 230 days.

This patent is subject to a terminal disclaimer.

(21) Appl. No.: 13/218,459

(22) Filed: Aug. 26, 2011

(65) Prior Publication Data

US 2013/0048454 A1 Feb. 28, 2013

(51) Int. Cl.
*F16D 55/228* (2006.01)

(52) U.S. Cl.
USPC ..................................... 188/72.5; 188/73.47

(58) Field of Classification Search
USPC .......... 188/26, 71.1, 72.4, 73.1, 73.31, 73.47, 188/72.5

See application file for complete search history.

(56) References Cited

U.S. PATENT DOCUMENTS

| | | | | |
|---|---|---|---|---|
| 7,946,115 B2 * | 5/2011 | Moore | .......................... | 60/547.1 |
| 8,083,035 B2 * | 12/2011 | Sato et al. | .................... | 188/71.1 |
| 8,479,891 B2 * | 7/2013 | Moore | .......................... | 188/72.5 |
| 2006/0175156 A1 * | 8/2006 | Sato et al. | .................. | 188/73.47 |
| 2007/0045057 A1 * | 3/2007 | Kawai et al. | .................... | 188/26 |
| 2009/0014260 A1 * | 1/2009 | Brioschi | ..................... | 188/73.31 |
| 2009/0101454 A1 * | 4/2009 | Nanri et al. | ................ | 188/73.47 |

* cited by examiner

*Primary Examiner* — Thomas J Williams

(57) ABSTRACT

A bicycle hydraulic brake clamp includes a clamp, two piston assemblies and a separation board. The clamp has a first slot defined on the middle thereof so that a brake disk is received therein. A second slot and a third slot are respectively defined in two sides of the clamp. A through hole is defined through the clamp and communicates with the third slot. The separation board is fixedly engaged with the through hole via the first slot by a way of welding. The two piston assemblies are respectively installed in the second and third slots via the first slot. The separation board is securely engaged with the through hole so as not only to prevent the separation board from dropping from the clamp by exterior impact, but also to protect the separation board from being damaged by the exterior impact.

1 Claim, 3 Drawing Sheets

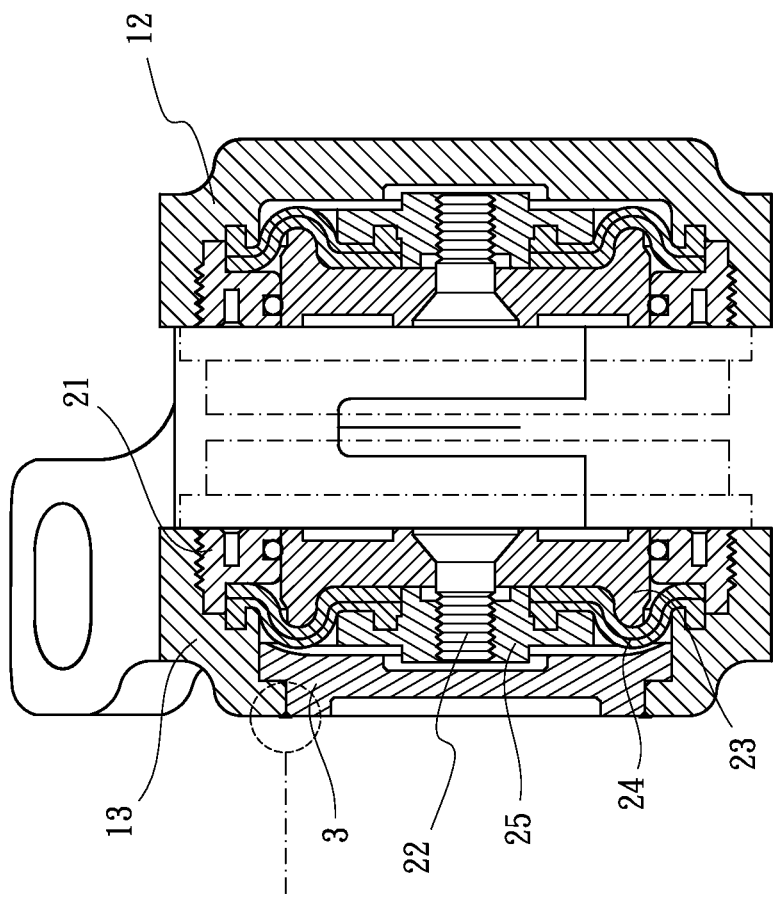
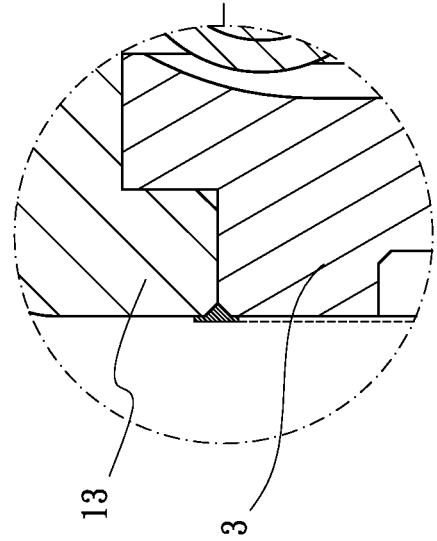
FIG. 3
FIG. 4

BICYCLE HYDRAULIC BRAKE CLAMP

FIELD OF THE INVENTION

The present invention relates to a hydraulic brake clamp, and more particularly, to a compact and light hydraulic brake clamp for bicycles.

BACKGROUND OF THE INVENTION

A conventional hydraulic brake clamp used for bicycle brake system known to application includes some shortcomings such as leakage, complicatedly manufacturing processes, high assembly cost and unstable structures. The reason is that the conventional hydraulic brake clamp is composed of two parts and the piston is installed into the clamp from outside of the parts.

Applicant provided a cap which is threadedly connected to the aperture of the clamp so as to prevent the piston from dropping out from the clamp and simplifying the structure of the conventional hydraulic brake clamp.

However, there are still some defects existed for the improvements. First, when the brake clamp is assembled, the cap is rotated relative to the clamp. If the cap would be overly rotated and the thread would be damaged, the hydraulic oil would leak from the cap. The cap connected to the aperture of the clamp is not well sealed. Thus, any impact to the cap could damage the connection and let the hydraulic oil leak.

Second, when the cap is tightly and threadedly connected to the clamp, there is no proper stop provided to acknowledge the assembler to stop rotating the cap. If the cap is overly rotated, the cap is damaged.

Third, in order to avoid the cap from dropping from the clamp, the threaded section of the cap is made long enough, and the aperture is correspondingly made to accommodate the cap so that the total weight and size of the clamp will be increased.

The present invention intends to provide an improved bicycle hydraulic brake clamp to improve all of the shortcomings mentioned above.

SUMMARY OF THE INVENTION

The main objective of the present invention is to provide an improved bicycle hydraulic brake clamp.

To achieve the objective, a bicycle hydraulic brake clamp comprises a clamp, two piston assemblies and a separation board. The clamp has a first slot defined on the middle thereof so that a brake disk is received therein. A second slot and a third slot are respectively defined in two sides of the clamp. The first, the second and the third slots are in communication with each other. A through hole is defined through the clamp and communicates with the third slot. The separation board is fixedly engaged with the through hole via the first slot by a way of welding. The separation board has a flange which is securely engaged with the through hole. The two piston assemblies are respectively installed in the second and third slots via the first slot. The separation board is securely engaged with the through hole so as not only to prevent the separation board from dropping from the clamp by exterior impact, but also to protect the separation board from being damaged by the exterior impact. Furthermore, the structure of the bicycle hydraulic brake clamp is simplified and compact.

The piston assembly comprises a locking ring, a bolt, a push plate, a washer and a disk. The bolt, the push plate and the washer are located between the locking ring and the disk. The washer is located between the push plate and the disk. Each of the push plate, the washer and the disk has a hole respectively for the bolt extending through. The push plate, the washer and the disk are connected to each other by the bolt and connected within the locking ring. The hydraulic oil pushes the piston assemblies to slow down the bicycle.

The primary object of the present invention is to provide one bicycle hydraulic brake clamp that is light and compact, while improving the shortcomings of the conventional hydraulic brake clamps.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3 is a cross-sectional view of the bicycle hydraulic brake clamp along a line AA shown in FIG. 1;

FIG. 4 is a partially enlarged cross-sectional view of the bicycle hydraulic brake clamp to show the circled portion in FIG. 3.

DETAILED DESCRIPTION OF THE PREFERRED EMBODIMENT

Figure 1:
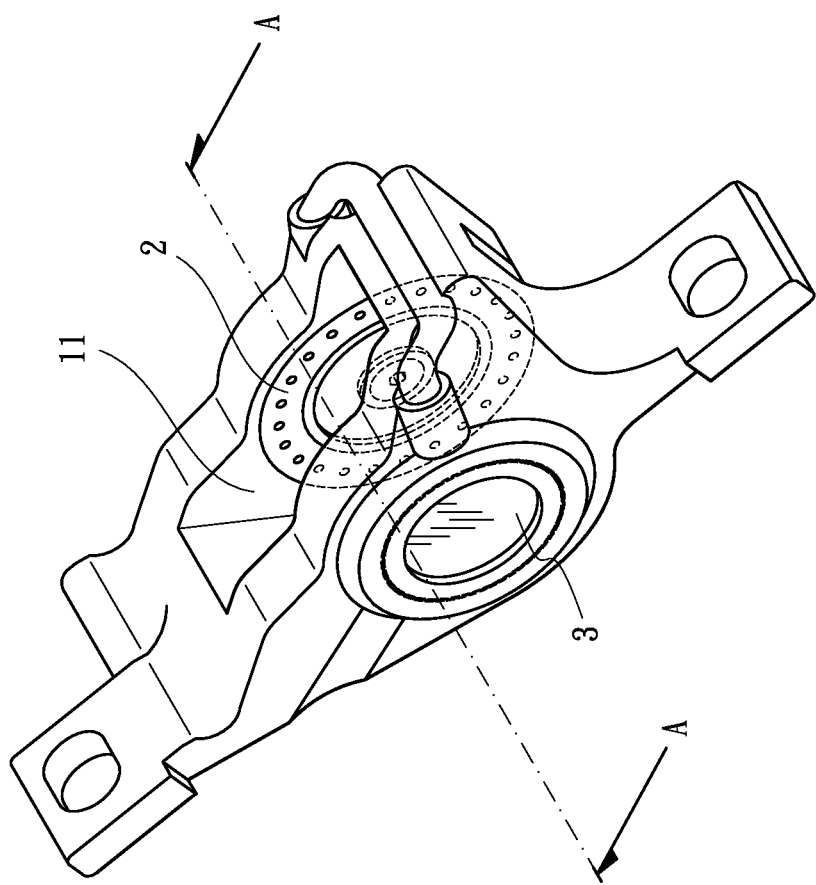
FIG. 1 is a perspective view of the bicycle hydraulic brake clamp of the present invention.
Figure 2:
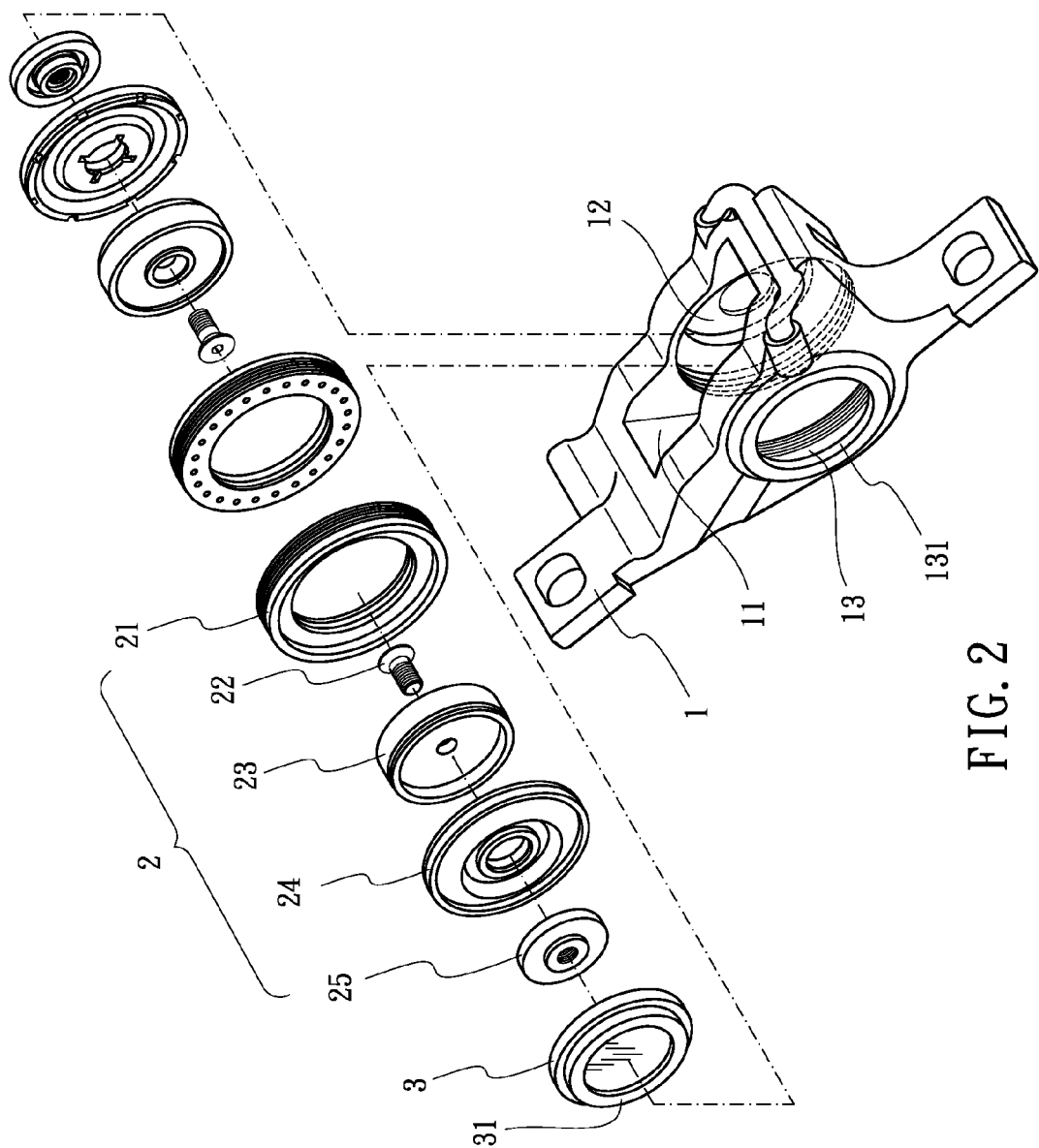
FIG. 2 is an exploded view of a bicycle hydraulic brake clamp of the present invention.

Referring to FIGS. 1 to 4, a bicycle hydraulic brake clamp in accordance with the present invention comprises a clamp 1, two piston assemblies 2 and a separation board 3. The clamp 1 is an integrally formed part to improve the shortcomings of the conventional hydraulic brake clamp that is composed of two parts.

The clamp 1 has a first slot 11 defined on the middle thereof for receiving a brake disk therein. Therefore, the interaction between the clamp 1 and the brake disk causes bicycles to slow down. A second slot 12 and a third slot 13 are respectively defined in the two sides of the clamp 1. The first, the second and the third slots 11, 12, 13 are in communication with each other. A through hole 131 is defined through the clamp 1 and communicates with the third slot 13.

The two piston assemblies 2 are respectively installed in the second and the third slots 12, 13 via the first slot 11. Each of the piston assemblies 2 comprises a locking ring 21, a bolt 22, a push plate 23, a washer 24 and a disk 25. The bolt 22, the push plate 23 and the washer 24 are located between the locking ring 21 and the disk 25. The washer 24 is located between the push plate 23 and the disk 25. Each of the push plate 23, the washer 24 and the disk 25 has a hole respectively for the bolt 22 extending through. The push plate 23, the washer 24 and the disk 25 are connected to each other by the bolt 22 and connected within the locking ring 21. The piston assemblies 2 are in operation by the hydraulic oil to slow down the bicycle. The separation board 3 is fixedly engaged with the through hole 131 via the first slot 11 by a way of welding. The separation board 3 has a flange 31 which is securely engaged with the through hole 131 so that the separation board 3 completely seals the third slot 13. As mentioned before, in order to securely connect the cap to the aperture of the conventional hydraulic brake clamp, the cap has a longer section with threads so as to be threadedly connected to the aperture, and the aperture has to be made large enough for the cap. Therefore, the size and the weight of the conventional hydraulic brake clamp are increasing. On the contrary, the present invention uses the flange 31 to be welded completely to the through hole 131 not only to prevent the piston assemblies 2 from dropping from the through hole 131, but also to protect the separation board 3 from being damaged by the exterior impact. Furthermore, the structure of the bicycle hydraulic brake clamp is simplified and compact.

As shown in FIGS. 3 and 4, the second slot 12 accommodates one of the two piston assemblies 2 and the third slot 13 accommodates another piston assembly 2 and the separation board 3. The bolt 22 extends through the push plate 23, the washer 24 and the disk 25, and is engaged with the inside of the locking ring 21. The separation board 3 fully seals the third slot 13 so that the leakage is not presented and the piston assemblies 2 are precisely operated by the hydraulic oil. The separation board 3 is protected from being damaged because no threading action is needed. The weight and size can be maintained within the desired light weight and compact size.

As shown in FIG. 1, the diameter of the second slot 12 is nearly identical with the diameter of the third slots 13. This is one important difference from the conventional hydraulic brake clamp. In order to avoid the cap from dropping from the clamp, the threaded section of the cap is made long enough, and the aperture is correspondingly made to accommodate the cap so that the diameter of the aperture (said third slot) for accommodating the cap is much larger than the opposite aperture (said second slot). Thus, the conventional hydraulic brake is often large and heavy. However, the hydraulic brake clamp of the present invention is compact and light. In addition, the leakage problem is eliminated in the present invention.

Although the invention has been explained in relation to its preferred embodiment, it is to be understood that many other possible modifications and variations can be made without departing from the spirit and scope of the invention as hereinafter claimed.

What is claimed is:

1. A bicycle hydraulic brake clamp comprising:

a clamp having a first slot defined on the middle thereof for receiving a brake disk therein, a second slot and a third slot respectively defined in two sides of the clamp, the first, the second and the third slots being in communication with each other, a through hole defined through the clamp and communicating with the third slot;

two piston assemblies being respectively installed in the second and the third slots via the first slot, each of the piston assemblies having a locking ring, a bolt, a push plate, a washer and a disk, the bolt, the push plate and the washer being located between the locking ring and the disk, the washer being located between the push plate and the disk, each of the push plate, the washer and the disk having a hole respectively for the bolt extending through, the push plate, the washer and the disk being connected to each other by the bolt and connected within the locking ring, the piston assemblies being precisely operated by the hydraulic oil for slowing down; and a separation board welded to the through hole via the first slot and having a flange which is securely engaged with the through hole;

wherein the flange is welded to the through hole not only to prevent the piston assemblies from dropping from the through hole, but also to protect the separation board from being damaged by the exterior impact; furthermore the structure of the bicycle hydraulic brake clamp is simplified and compact.

* * * * *